United States Patent [19]

Buhidar

[11] Patent Number: 5,221,312
[45] Date of Patent: Jun. 22, 1993

[54] WATER AND SOIL TREATMENT METHOD

[75] Inventor: Balthasar Buhidar, Twin Falls, Id.

[73] Assignee: Nutri-Sul International, Inc., Logan, Utah

[21] Appl. No.: 948,412

[22] Filed: Sep. 22, 1992

Related U.S. Application Data

[63] Continuation of Ser. No. 572,881, Aug. 27, 1990, abandoned, which is a continuation of Ser. No. 255,959, Oct. 11, 1988, abandoned, which is a continuation-in-part of Ser. No. 37,519, Apr. 13, 1987, abandoned.

[51] Int. Cl.$^5$ ............................ C05F 7/00; C05F 9/00
[52] U.S. Cl. ............................................ 71/12; 71/63; 71/64.1; 71/903
[58] Field of Search ...................... 71/12, 13, 63, 64.1, 71/903, 904

[56] References Cited

U.S. PATENT DOCUMENTS

| | | | |
|---|---|---|---|
| 3,880,237 | 4/1975 | Snavely, Jr. et al. | 423/242 |
| 3,913,677 | 10/1975 | Collins | 166/307 |
| 4,302,236 | 11/1981 | Roman | 71/9 |

Primary Examiner—Ferris Lander
Attorney, Agent, or Firm—Marcus G. Theodore

[57] ABSTRACT

A water and soil treatment method comprising injecting $SO_2$ into an aqueous media until substantially all of the bicarbonates are removed and the desired pH is achieved, and applying the $SO_2$ treated aqueous media to soil until a soil pH of between 6.0 to 6.8 is achieved and approximately 40 to 60% of the soil bicarbonates are removed.

16 Claims, 1 Drawing Sheet $$[H_2CO_3] = [HCO_3+] + [H_3O+] = [CO_3=] = 2[H+]$$

WATER AND SOIL TREATMENT METHOD

BACKGROUND

Related Applications

This application is a continuation of the continuation application entitled "Water and Soil Treatment Method, Ser. No. 572,881, filed Aug. 27, 1990 of the continuation-in-part application entitled "Water and Soil Treatment Method", Ser. No. 255,959 filed Oct. 11, 1988 of the original application entitled "Water and Soil Treatment Method" filed Apr. 13, 1987, Ser. No. 037,519 all now abandoned.

FIELD

This invention relates to water and soil treatment methods. Specifically, it relates to a water treatment method for adjusting pH, alkalinity, water quality, and algal and pathogen control; and a soil treatment method for enhancing soil reclamation, irrigation efficiency through sulfur interactions with other soil characteristics, and specific algal/fungal/mold/and pathogen control.

STATEMENT OF THE ART

Various water and soil conditioning and treatment methods are known. Irrigation waters in alkaline areas such as the Western United States have historically been treated with fertility-type amendments to improve their quality and make them applicable for soil reclamation and irragation efficiency. Fertilizer and acid treatment methods for soil reclamation have also been employed for years. Generally, these methods have been ineffective in reducing alkaline deposits which build up and clog the soil; thereby interfering with the plant roots' access to soil water, nutrients, and aeration. In many areas, a surface crust can be seen as a result of these alkaline deposits. As the soil porosity decreases, more water is required for field application to maintain a moisture requirement for the crop. This in turn causes greater alkaline build up; but in addition more fertilizer and nutrients need to be applied since a high percentage of these plant nutrients run-off as they are prevented from penetrating the soil. The soil must also be tilled extensively to break up the crust for a more manageable soil.

The USDA has traditionally classified water quality in terms of suitability for crop production based on certain levels of sodium and salinity hazards. In addition, specific constituents such as sodium, chlorides, and boron have been defined as toxic depending upon their excess. In considering the total salt content (TSC) in this classification scheme, it has been generalized that a water with excessive total salt content (TSC) will possess excessive sodium and/or chloride, and not necessarily induce a water permeability problem in the soil, but may toxify the crop due to excessive sodium, chlorides, or boron. Whereas, a low total salt content (TSC) water promotes water permeability problems in the soil because of cation imbalance. These permeability and/or toxicity problems due to low or excessive salt (TSC) water have been offset by fertilizer amendment application in order to reduce the toxic effects of sodium, chloride, and boron through mass action of the added amendment.

An additional criteria which helps to evaluate irrigation water quality and performance uses the carbonate/bicarbonate ($CO_3^=$/$HCO_3^-$) species in relation to sodium ($Na^+$), calcium ($Ca^{++}$), and magnesium ($Mg^{++}$). This is the SARa ratio. Reduction of the carbonate/bicarbonate species reduces permeability hazards brought on by "inefficient" quality water.

Evidence has shown that the carbonate/bicarbonate species in irrigation waters can be directly toxic to plants; can precipitate from irrigation water the calcium and magnesium content as lime; can burn leaves through evaporated lime deposits; can influence the texture of the soil when present in appreciable amounts; can impede the movement and infiltration of water in the soil; and can retard plant root system development. Conversely, if regulated, the carbonate/bicarbonate species in irrigation water can provide readily available sources of calcium and magnesium for exchangeable sodium replacement in the soil's cation exchange sites.

Among the most widely used fertilizer amendments which aid in offsetting these permeability problems through increased irrigation water efficiency are the neutral sulfate salts, like gypsum, and acidifiers like sulfuric acid, ammonium polysulfide, elemental sulfur, and more recently, sulfur dioxide ($SO_2$). Gypsum is generally soil surface applied to treat soil containing low or no lime. The acidifying sulfur compounds are used when high levels of soil lime exist.

In summary, to combat these water and soil problems, various acid and fertilizer applications have been tried. Where strong acid treatments are employed through irrigation systems, corrosion damage to steel, gated pipe, or cement ditch canals have been reported due to improper mixing of the acid in the irrigation system causing a low buffering capacity of the water. Also, crop damage has been reported due to the effects of strong acids in the soil which release hydrogen and aluminum ions, as well as providing sources of heavy metal contaminants due to the low grade quality of the acid. In addition, such acids are generally applied in an indiscriminate manner and fail to provide for the crops' sulfur requirements. Sulfur dioxide applications have in the past not been properly regulated to insure an optimum pH and carbonate/bicarbonate balance in the irrigation water. Applicant's method described below provides for a regulated application of sulfur dioxide which maintains a water pH and carbonate/bicarbonate balance at optimal levels.

Various references, such as Snavely et al., U.S. Pat. No. 3,880,237 and Collins, U.S. Pat. No. 3,913,677, utilize a sulfur dioxide treated stream, but here the similarity stops. These references are extraction solvent methods to remove product from petroleum rock formations. They are not concerned with delivering sulfur compounds within the soil substrate in stoichiometric ratios required for plant growth. Nor can they be combined with Wagner et al., U.S. Pat. No. 4,283,219, which discusses agrochemical agents and their uses at concentrations and ranges well below those required with well means for injecting caustic fluid into rock formations to dissolve and break up the oil-bearing strata for petroleum extraction.

Applicant's method differs from Collins' method in which a calcium compound reactive with sulfurous acid is added to form calcium sulfite or calcium bisulfite in treated water, and sufficient additional sulfur dioxide is provided for this reaction and to provide said excess. Nor does it claim that the calcium compound is added as calcium carbonate. Applicant's method does not add calcium bisulfite or calcium sulfite to the treated water.

Nor is applicant's method a method of treating oil-bearing strata in oil wells. Collins corrosive treatment method essentially dissolving and destroying the soil substrate to selectively leach petroleum is totally unsuitable for plant growth. Nor does it address any of the sewage treatment applications claimed by applicant. As such it fails to provide any of the deficiencies described above.

Applicant's method of application of sulfur dioxide to treat irrigation water or sewage sludge is not an obvious choice or design for the treatment of soils derived from any of the above references. To the extent that a specific amount of sulfur dioxide as a consequence of a known level of aqueous alkalinity for improving the quality of the aqueous environment for water application in soil treatment for crop improvement, the agronomic intent is above that of ordinary skill in the art.

The claimed method being sought does not claim to extract petroleum from a petroleum-bearing formations. Nor does it treat oil-bearing strata in oil wells by sulfur dioxide applications in excess of the stoichiometric amount needed to remove bicarbonates, and carbonates. Instead applicant's soil treatment method so described is a surface contact application to improve crop development by conditioning the soil substrate without consideration of deep-bearing or strata petroleum wells.

Wagner's application of agrochemical agents and their uses does not addresses the requirement to first increase the porosity of the soil substrate by breaking down the soil bicarbonate buildup to provide an improved substrate for root penetration and delivery of nutrients. Nothing in Wagner suggests soil conditioning can be accomplished, while simultaneously delivering nutrients to growing plants. Wagner simply discloses another fertilizer and application method.

None of the above references are water treatment methods. Nor do they disclose the water treatment parameters for various types of soil conditions. As previously discussed, Snavely and Collins are extraction solvent methods to remove product from petroleum rock formations. They are extremely caustic methods unsuitable for plant application. Nor are they concerned with the pH or bicarbonate composition of water. Nor do they increase the porosity of soil growing surfaces to provide an improved substrate for root penetration and delivery of sulfur nutrients.

Roman, U.S. Pat. No. 4,302,236, uses raw sewage as a type of air filter to absorb and remove from burned coal exhaust any $SO_2$ gas contained therein. Roman does not disclose $SO_2$ injection to meet the critical pH and water alkalinity ranges to properly treat soil substrates for crop improvement. It does not act as a water treatment method using soil as an ion exchange media, in the same manner as applicant's soil treatment method. The $SO_2$ in the burned coal exhaust is so small that it has little or no effect on the sewage pH or the thermophilic bacterial-phase digestion; producing continual odors as the raw sewage decomposes. Conversely, applicant's method adds sufficient $SO_2$ to de-water or sterilize the sewage. Nor is there anything in Roman reference which suggests removal of the heavy metals from the treated sewage before field application. Without removal of the metals from sewage, field application on crops grown for human consumption is prohibited in most areas of the country.

Neither Snavely, Collins, or Wagner disclose applicant's unique sewage treatment and soil conditioning method disclosed in claim 8 below. Nor are they concerned with removing heavy metals before soil application. As such, they do not address or meet any of the environmental concerns regarding sludge treatment and disposal.

Specifically, comparing applicant's method of claim 1, with Snavely, applicant does not claim a method to produce petroleum from a petroleum-bearing formation penetrated by well means injecting a caustic fluid into said formation either as one or any of the following:

(1) provide a caustic fluid having bicarbonate ions for injecting into said petroleum-bearing formation.

(2) treat a caustic fluid having bicarbonate ions with sulfur dioxide to reduce the bicarbonate ion concentration of said fluid.

(3) add a caustic to said treated fluid having bicarbonate ions with sulfur dioxide to reduce the bicarbonate ion concentration of said fluid.

(4) inject said caustic fluid via said well means into said petroleum-bearing formation.

(5) produce petroleum via said well means from said petroleum-bearing formation.

Applicant's method described in claim 2 is a further refinement of applicant's method of claim 1; that is the method of treating said fluid having bicarbonate ions to provide specific pH ranges. As a result none of the following pivotal to Snavely are claimed:

1) passing sulfur dioxide gas through a contactor vessel as described in Snavely, et al.

2) passing caustic fluid having bicarbonate ions through said contactor vessel in counterflow with said sulfur dioxide gas to reduce the bicarbonate ion concentration of said caustic fluid by substituting sulfate ions for said bicarbonate ions.

3) discharging said caustic fluid of reduced bicarbonate ion concentration from said contactor vessel as described in Snavely.

Applicant's method described in claim 3 again is a further refinement of applicant's method of claim 1, and in addition to the foregoing does not require the sulfur dioxide gas to be a flue gas containing sulfur oxides.

Applicant's method of claim 4 also does not claim the foregoing; nor is caustic fluid having bicarbonate ions produced as alkaline water recovered from an earth formation.

Applicant's method of claim 5 does not claim the foregoing, and does not have caustic additive added to the said treated caustic fluid in an amount sufficient to provide a pH value of said caustic fluid of at least about 11.5.

Applicant's method in claim 6 does not claim the Snavely oil extraction method, or its corollaries. It is directed to a combined sewage treatment, soil conditioning and nutrient method. In addition, applicant's method does not:

1. generate a hot fluid by injecting feed water into a hot fluid generator and firing said hot fluid generator with a sulfur containing fuel, said hot fluid generator emitting a flue gas containing sulfur oxides.

2. pass said flue gas containing sulfur oxides through a contractor vessel as described in Snavely.

3. pass a water having bicarbonate ions through said contact vessels as described in Snavely in counterflow with said flue gas to reduce the concentration of said bicarborbonate ions by substituting sulfate ions for said bicarbonate ions.

4. discharge said flue gas from said contactor vessel as described in Snavely.

5. discharge said water of reduced bicarbonate ion concentration from said contactor vessel as described in Snavely.

6. inject a least a portion of said discharge water of reduced bicarbonate ion concentration into said hot fluid generator as feed water.

7. add a caustic additive to said hot fluid to form a hot caustic fluid.

8. inject said hot caustic fluid via said well means into said petroleum-bearing formation.

9. produce petroleum via said well means from said petroleum bearing formation.

Applicant's method desccribed in claim 7 is a further refinement of the method of claim 6, and therefore does not comprise any of the foregoing. In addition, it does not comprise adding said caustic to at least another portion of said water of reduced bicarbonate ion concentration and mixing said with at concentration least another portion with said hot fluid to form said hot caustic fluid.

Applicant's method described in claim 8 is a unique sludge treatment, soil conditioning, and fertilizing method. It does not require any of the following required by Snavely:

1. generate a flue gas having sulfur oxides by firing a flue gas generator with sulfur-containing fuel.

2. produce alkaline water having bicarbonate ions via said production well for underground formations.

3. clarify at least a portion of said produced alkaline water containing bicarbonate ions.

4. pass said clarified alkaline water containing bicarbonate ions through a contactor vessel as described in Snavely.

5. pass said flue gas containing sulfur oxides through said contactor vessels as described in Snavely in counterflow with said clarified alkaline water containing bicarbonate ions to reduce the bicarbonate ion concentration of said water.

6. discharge said flue gas from said contactor vessels as described in Snavely.

7. discharge said water of reduced bicarbonate ion concentration from said contactor vessel as described in Snavely.

8. add a caustic to said water of reduced bicarbonate ion concentration to form a caustic water.

9. inject said caustic water via said injection well into said formation containing petroleum and alkaline water having bicarbonate ions.

10. produce petroleum and alkaline water having bicarbonate ions via said production well from said formation.

Comparing applicant's method with Collins, applicant's method described in claim 1, does not claim the Collins method of treating oil-bearing strata in oil wells comprising any and all of the following corollaries:

1. treating water by absorbing in said water sulfur dioxide in excess of the stoichiometric amount needed to remove any elementary oxygen from said water.

2. treating water by absorbing in said water sulfur dioxide in excess of the stoichiometric amount needed to remove all bicarbonate and carbonate ions from said water.

3. treating water by absorbing in said water sulfur dioxide in the stoichiometric amount described above, and adding iron to the water as a catalyst for the removal of oxygen.

4. treating water as described above, and thereafter, without exposing said treated water to oxygen or to air, injecting said treated water into said strata.

None of the above references therefore suggest or anticipate applicant's water and treatment method described below.

SUMMARY OF THE INVENTION

Applicant's method comprises: injecting SO2 gas into an aqueous media until all the alkalinity is removed and the desired pH is achieved, and then applying said treated aqueous media to the soil until a pH of between 6.0 and 6.8 is achieved, and approximately 40 to 65% of the bicarbonates are removed from the soil. This soil treatment method conditions the soil in the manner described below, while applying to the soil sulfur and other soil nutrients contained in aqueous media, such as sludge.

In one preferred agricultural irrigation water application, a two step method is used. This preferred irrigation water application method comprises: injecting predetermined amounts of $SO_2$ into an aqueous media until all the alkalinity is removed; reinjecting this primary treated aqueous media (PTAM) back into untreated aqueous media until a pH of between 6.0 and 6.8 is achieved, approximately 40 to 65% of the aqueous media bicarbonates are removed to form a secondary treated aqueous media (STAM), and applying the secondary treated aqueous media (STAM) to soil for purposes of soil reclamation, irrigation efficiency, and fertility improvement for greater crop yield and quality. The soil is preferably conditioned by applying bicarbonate regulated SO2 enriched aqueous media. This acidified bicarbonate regulated STAM interacts with the soil calcium carbonates ($CACO_3$) and begins to breakdown into soluble anhydrite $CaSO_4$, water, and carbon dioxide ($CO_2$).

The bicarbonates are all essentially removed in the PTAM. The PTAM is reinjected into the initial aqueous media to produce a STAM, which, if held at a pH less than 5.2, removes essentially all of the bicarbonates as well. It was found that when the aqueous media is maintained at a pH between 6.2 to 6.5 with less than 50 to 60% of the bicarbonates being removed, that better effective results were seen in the aqueous media application to the soil. Thus, optimal results are observed in the 6.0 to 6.8 pH range. This optimal range results in more economical applications by requiring less sulfur to be burned and injected, and has the further advantage of not lowering the pH to a point where it damages certain irrigation equipment.

The aqueous media may be irrigation water, sewage sludge, or other aqueous nutrient supplement. Sulfur dioxide ($SO_2$)is used because it not only provides the sulfur plant nutrient, but acts as a Lewis acid by attaching itself to any unshared pair of electrons such as inorganic or organic bases. The $SO_2$ readily reacts with water and forms a complex acidic system containing hydrated sulfur dioxide ($H20.SO2$), bisulfite ($HSO_3^-$), sulfite ($SO_3^=$), and disulfite ($S_2O_5^=$). No appreciable amounts of sulfurous acid ($H_2SO_3$) have been detected, since it is a transitional formation and for all practical purposes is probably non-existent.

The soil chemical reaction affected by applicant's process, although complex in nature, is fundamentally an ion-exchange phenomenon. A positively charged ion [Sodium($Na^+$), as an example] attached to a negatively charged soil clay particle is exchanged for a positively charged calcium (Ca++) ion in the soil water. One of the major objectives of applicant's process is to provide a treated water that will promote this cation exchange by increasing the availability of Ca++ ions. The displaced Na+ ions can form soluble salts with negatively charged ions such as chlorides or sulfates. In essence the ion exchange reaction of applicant's process is similar to the reaction occurring in common household water softeners. In the field, the soil's clay particles function much like the man-made resins found in conventional water softener systems.

The chemical reactions behind applicant's process may be diagrammed by the following equilibrium equations:

| A. Primary Treated Aqueous Media (PTAM) | |
|---|---|
| 1. Formation of SO2 in Machine: | $S + O_2 = SO_2$ |
| 2. Injection of SO2 into Small Diverted Portion of Aqueous Media: | $SO_2 + H_2O = H_2O.SO_2 =$ $H_3O^+ + HSO_3^- (pK = 1.92)$ $HSO_3^- = H_3O^+ + SO_3^{32} (pK = 7.20)$ |
| B. Secondary Treated Aqueous Media (STAM) | |
| 1. Reinjection of PTAM into Aqueous Media with Interaction of Dissolved Oxygen | $H_2O.SO_2 + \frac{1}{2} Ox. Agent (O_2) =$ $H_2SO_4$ |
| C. Soil Treatment | |
| 1. Interaction with Soil CaCO3: | $H_2SO_4 + CaCO_3 = CaSO_4 + H_2O + CO_2$ |
| 2. Soluble Ca Exchanging with Exchangeable Na in Cation Exchange Sites: | $CaSO_4 + 2Na.X = Ca.X + Na_2SO_4$ where X = soil's exchange site |

Sulfuric acid has historically been used to treat alkali soils by adding it to irrigation water and by direct application to the field. Although identical in chemistry to the soil treatment reaction discussed above, the acid is extremely corrosive, dangerous for human transport and requires special precautions in its application. Also, in view of the fact that the acid is unbuffered, wild fluctuations in pH result if applied through the irrigation water, and severe damage to plants results when the strong sulfuric acid is applied to a growing crop. Another approach has been to apply acid-forming materials to the soil. For example, elemental sulfur can be applied. However, to be effective, sulfur must be converted to sulfuric acid by specific soil microorganisms. Unfortunately, the complete conversion requires one to seven years depending upon the temperature of the geographic location, the composition of the soil's microorganism population, and the soil's moisture content.

In contrast to the above methods of acidification, applicant's process acts immediately; that is there is minimal waiting for the conversion step of sulfur to sulfate, the primary plant uptake form of sulfur. Furthermore, the problems of handling a very corrosive chemical are eliminated, and the degree of treatment is easier to control, because the burning of sulfur is regulated.

To evaluate the effect of the STAM (and even the PTAM, if desired) on irrigation water efficiency and performance, and soil water permeability, several mathematical methods are used. These are: Sodium Adsorption Ratio (SAR), Adjusted Sodium Adsorption Ratio (SARa), Residual Sodium Carbonate (RSC), and Eaton's Gypsum Requirement (EGR).

The SAR equation is an expression of the relative activity or adsorption of the water-soluble sodium ion on the clay, and is applicable to irrigation waters as well as soil solutions. Values greater than 6.00 represent a potential sodium hazard of the water or soil solution. The ratio is defined mathematically as follows, with the sodium (Na+), calcium (Ca++), and magnesium (Mg++) constituents represented in concentrations in milliequivalents per liter (meq/l):

$$SAR = Na+/[CA^{++} + Mg^{++}]^{\frac{1}{2}}$$

The SARa equation has become more used and valuable than the SAR, primarily because the SARa includes the added effects of precipitation and solution of calcium in soils as related to carbonate (CO3=) and bicarbonate (HCO3−) concentration. The SAR value, within the SARa equation, is adjusted according to the effects of (CO3+HCO3−). Values less than 6.00 indicate a low probability of problems with sodium or permeability; 6.00 to 9.00 indicate increasing probability of problems; and, greater than 9.00 indicate severe probability of problems The pHc coefficient with a value greater than 8.40 indicates a tendency to dissolve the lime (CaCO3) in the soil through which the water moves. pHc values less than 8.40 indicate a tendency to precipitate the lime from the water applied. Like the SAR, the SARa is defined mathematically with he sodium, calcium, and magnesium ions represented in concentration in milliequivalents per liter (meq/l). However, three sub-coefficients make up the pHc coefficient, and these values are obtained from tables which convert the meq/l concentrations to a logarithmic concentration as molality. The ratio may be written as follows:

$$SARa = (SAR)(9.40 - pH_c)$$

$$pHc = (pK'_2 - pK'_c) + p(CA^{++} + Mg^{++}) + pAlk-(CO3^= + HCO3^-)$$

pK'2 is the second dissociation constant for H2CO3 (bicarbonic acid). pK'c is the solubility constant for CaCO3(lime), both corrected for ionic strength. p(Ca+++Mg++) is the negative buildup logarithm of the molal concentration of CA++ plus Mg++. pALK (CO3=+HCO3−) is the negative logarithm of the total titratable base (CO3=+HCO3−). Values of pK'2−pK'c are obtained from the total cation concentration (Na++CA+++Mg++).

The RSC equation (developed by Franck M. Eaton in 1950) is based on the tendency for sodium to be precipitated as carbonate after the calcium and magnesium are likewise precipitated as carbonates. Unfortunately, it does not take into account the sodium content of the water or soil solution. Positive values indicate a potential sodium buildup hazard. Multiplying the RSC by 234 give the gypsum requirement in pounds of 100% gypsum per acre foot of water (#CaSO4/A.FT.Water). The expression is as follows, and its ionic constituents are in milliequivalents per liter (meq/l):

$$RSC = (CO_3^= + HCO_3^-) - (Ca^{++} + Mg^{++})$$

The EGR equation (also developed by Frank M. Eaton in 1966) determines the calcium deficit in the water as gypsum. Positive values indicate a potential sodium buildup harzard, because of low calcium. Negative values indicate that the water will deposit gypsum (or, Calcium) because of low sodium. All ionic constituents are in milliequivalents per liter (meq/l), and the equation is as follows:

$$EGR = 234 (a+b+c)$$

where
$a = 0.43 \, Na^+ - (Ca^{++} + Mg^{++})$
$b = 0.7 \, (CO_3^= + HCO_3^-)$
$c = 0.3$ The above equations may all be used to measure the potential hazard of sodium buildup which affects soil sealing and poor water infiltration. This sodium buildup is primarily attributed to low levels of $Ca^{++}$ and $Mg^{++}$ in relation to the $Na^+$, $CO_3^=$, and $HCO_3^-$ in irrigation water of soil solutions. This is especially true of sodic and saline-alkali soils found in southwestern portion of the United States. The $CA^{++}$ and $Mg^{++}$) reduces the $Na^+$ buildup hazard in the soil by exchanging for the exchangeable $Na^+$ on the soil's cation exchange sites.

Applicant's method variably injects $SO_2$ gas into irrigation water or other aqueous mixtures or media, such as sewage sludge and/or wastewater to be applied to soils. A variable pH $SO_2$ generator, such as that produced by Nutri-Sul, Inc., P.O. Box S, Logan, Utah 84321) is used to adjust the acid concentration to treat differing soil conditions. This enables the aqueous media to be acidified to provide a solution which adjusts the aqueous media conditions to a pH of between 6.0 and 6.8, and provides a 40 to 65% bicarbonate ($HCO_3^-$) removal. As discussed above, the most effective range in field tests was a STAM pH of between 6.2 to 6.5 and a 50 to 60% bicarbonate removal when alkaline, saline-alkali, and alkali soils were encountered. It was also observed that by monitoring the treatment of the aqueous media under these optimal conditions, within the first 60 to 80 days of germination of a crop, approximately 75% of the sulfur requirements of the crop were supplied. This was found for such crops as irrigated wheat, barley, almonds, citrus, potatoes, beans, peas, corn, cotton, sugar beets, sugarcane, and other vegetable crops. After the seedlings had established their roots, the soil penetration by the plant itself was sufficient to eliminate the need for continual soil conditioning with the $SO_2$ enriched aqueous media, unless the aqueous media to be applied thereafter was so poor that continuous SO2 treatment was required.

The overall effects of applicant's method in the field were to reduce $pH/HCO_3^-$, reduce the SARa, and the reduce alkaline hardness. When the method was used in the early crop germination period, increased crop production was observed. There was also a marked decrease in the amount of irrigation water and fertilizer required, and certain soil fungi and diseases were eliminated, while the plants' sulfur nutrients were supplied.

Applicant's method can be used to treat a number of aqueous nutrient solutions, from sludge or wastewater to fertilizer solutions, for application to the fields. When sewage sludge is treated and disinfected with $SO_2$, a nutrient enriched fertilizer substantially free of heavy metals is available for field application. Disinfection is accomplished by first lowering the pH to a pH of 2 for approximately 30 minutes to kill the pathogens. Heavy metals in this process are removed from the sludge and enter the wastewater fraction. The pH of the sludge, or wastewater, is then adjusted to the desired pH range. Before field application of the wastewater, heavy metals may be removed from the aqueous fraction by precipitation of the metal hydroxides by adding ammonia or lime and separating the metal cake.

In alkaline areas, the sewage sludge, after $SO_2$ treatment, is pH adjusted between a pH of 6 to 6.8 as described above before application. In acidic soil areas, the treated sludge or irrigation water, after $SO_2$ treatment, is injected with ammonia to create an alkaline mixture having a pH of 7.5 to 7.8 for field application. The ammonia complexes with the sulfates to form an enriched ammonium sulfate mixture which can be used to neutralize acidic soils. The pH is held below 7.8, to prevent the ammonia from coming out of solution before it reaches the fields. Other ammonium enriched additives may also be added.

In fields which are not in balance because of a very high or low pH buildup over the years, more acidic or basic solutions may be used to "shock" the soils. For example, for extremely alkaline soils, the soil may be initially "shocked" by providing an $SO_2$ enriched media having a pH as low as 2. At this low pH range all of the bicarbonates are removed from the aqueous media. After the soil neutralizes and buffers this highly acidified initial media application, the soil is then maintained with an $SO_2$ media having a pH between 6.0 and 6.8. These "shock" methods are not preferred, because, as with other conventional strong acid treatments, the upper soil levels may be loosened and made permeable to such a degree that the alkaline or acidic species in the lower soil levels migrate to the surface if irrigation water is not continually applied to push treated aqueous media through the soil. The need to continually apply irrigation water after a "shock" treatment may not be feasible if the soil water is too saturated. Thus continual weaker treatment applications are preferred. After the initial treatment of the soil, the $SO_2$ media pH application should approximate the optimal $pH/HCO_3$ ranges discussed above.

Marked crop improvements result from applicant's method from the on-set because the upper soil plant growth layers are first adjusted by topical applications. Subsequent $SO_2$ enriched aqueous media applications then percolate deeper into the soil to adjust the lower soil fractions for crops having deeper root systems.

In summary, applicant's method conditions the soil through irrigation water, or aqueous media treatment, and provides increased availability of sulfur as a nutrient. It increases percolation action of the soil, improves cation exchange capacity, and improves leaching of salts in addition to sodium, boron, chlorides, etc. Water retention and penetration are improved, as a result of increased soil porosity. The method also kills certain algae, moss, and bacteria while increasing irrigation water efficiency and performance by decreasing the levels of SAR, SARa, RSC, and EGR. These decreases aid in reducing the potential hazard of soil sodium buildup and low permeability by decreasing the $HCO3^-$ concentration in the aqueous media. By so doing, the SAR, SARa, RSC, and EGR are "adjusted and SO2 treated" to reduce the soil sodium buildup, and increase the irrigation water permeability and penetration. The SARa specifically showed that as the SARa of the aqueous media was reduced, so too was the SARa of the soil. The treatment, then, of aqueous media, such as irrigation water with sulfur dioxide was very effective and highly advantageous for soil reclamation and irrigation efficiency. It also enables nutrient enriched aqueous media, such as sewage sludge, to be safely applied to the fields.

DESCRIPTION OF THE ILLUSTRATED EMBODIMENTS

Figure 1:
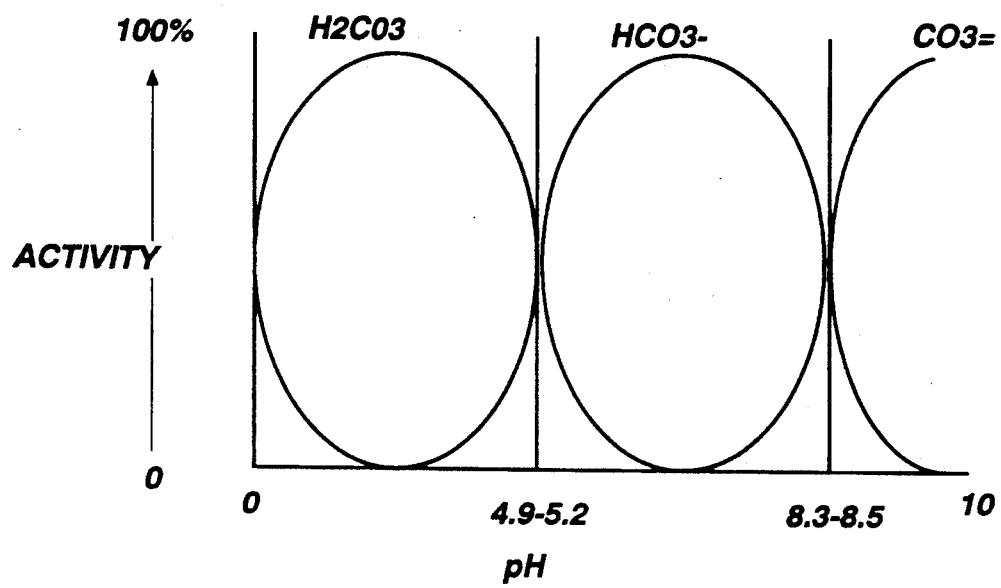
FIG. 1 illustrates the bicarbonate species present in aqueous solutions at various pH ranges.
Figure 2:
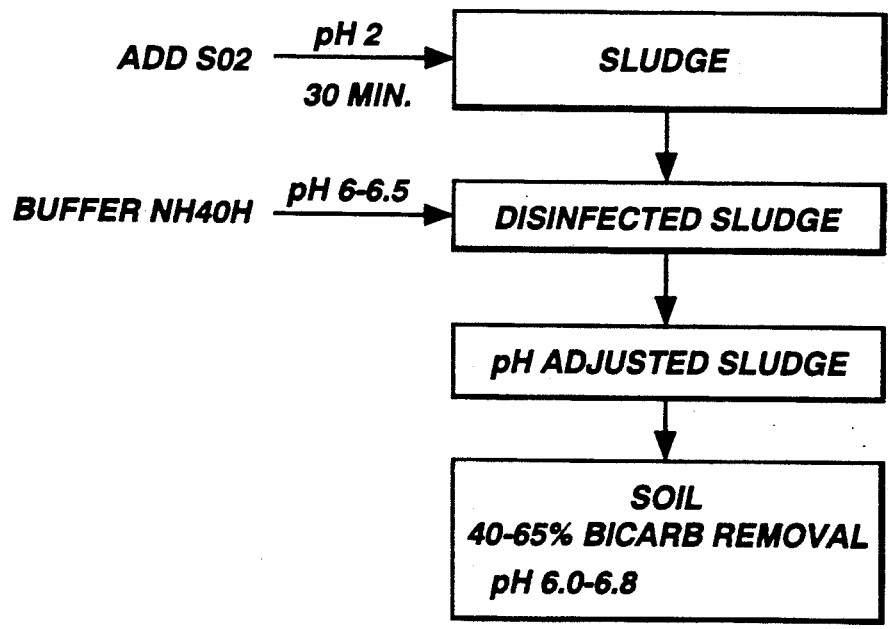
FIG. 2 is a sample flow method of one preferred embodiment of the invention.

FIG. 1 illustrates the bicarbonate species present in aqueous solutions at various pH ranges where applicant's method act to adjust the aqueous media to be applied to the soils. FIG. 2 illustrates a preferred embodiment of applicant's method applied to raw sewage. In the first step, raw sewage is injected with SO2 until a pH of 2 is achieved. The treated sewage is allowed to stand for approximately 30 minutes until the desired pathogen kill is achieved. After the pathogens are killed, the treated sewage is injected with ammonia to raise the pH to 6.0 to 6.5 for application to alkaline soils to optimally maintain the soil at a pH of 6.0 to 6.8 and approximately 40 to 65% of the bicarbonates are removed.

Although this specification has made reference to the illustrated embodiments, it is not intended to restrict the scope of the appended claims. The claims themselves recite those limitations deemed essential to the invention.

I claim:

1. A water and soil treatment method for adjusting the bicarbonate percentages and pH of aqueous solutions with SO2 for field application to prepare soil growing surfaces by reducing bicarbonate buildup therein while providing sulfur nutrients for crop improvement comprising:
   injecting SO2 gas into an aqueous media until all the alkalinity and dissolved oxygen is removed and a pH of approximately 2 to approximately 6.9 is achieved, to form an aqueous system containing hydrated sulfur dioxide $(H_2O).SO_2)$, bisulfite $(HSO_3^-)$, sulfite $(SO_4^=)$, and disulfite $(S_2O_5^=)$, and
   applying said SO2 treated aqueous media to the soil surface until a pH of between 6.0 and 6.8 is achieved, and approximately 40 to 65% of the bicarbonates are removed from the soil.

2. A water and soil treatment method for alkaline soils according to claim 1 wherein SO$_2$ is injected into the aqueous media until a pH of between 5.5 to 6.9 is achieved.

3. A water and soil treatment method according to claim 1 wherein the aqueous media is liquid fertilizer.

4. A water and soil treatment method for acidic soils according to claim 1 wherein SO$_2$ is injected into the aqueous media and adjusted with a base reagent until a pH of between 7.5 and 7.8 is achieved.

5. A water and soil treatment method according to claim 1 wherein the aqueous media is water.

6. A water and soil treatment method according to claim 1 wherein the aqueous media is sewage sludge.

7. A water and soil treatment method according to claim 1 wherein the aqueous media is sewage sludge, and the SO2 gas is injected until the pH is lowered to approximately 2 for sufficient time to achieve the desired pathogen kill before being adjusted to the desired pH for soil application.

8. A water and soil treatment method according to claim 7, including:
   separating the liquid fraction from the solid fraction after SO$_2$ injection,
   removing and separating the heavy metals from the liquid fraction by raising the pH of the liquid fraction to precipitate the heavy metals as hydroxides,
   adjusting the pH of the liquid and solid fractions to the desired levels, and
   applying the liquids and solid fractions to the soil.

9. A water and soil treatment method according to claim 8, wherein ammonia is used to adjust the pH of the liquid fraction to precipitate the heavy metals.

10. A water and soil treatment method for adjusting the bicarbonate percentages and pH of aqueous solutions with SO2 for field application to prepare soil growing surfaces by reducing bicarbonate buildup therein while providing sulfur nutrients for crop improvement comprising:
    injecting SO2 into an aqueous media until all the alkalinity is removed from the primary treated aqueous media to form an aqueous system containing hydrated sulfur dioxide $(H_2O).SO_2)$, bisulfite $(HSO_3^-)$, sulfite $(SO_4^=)$, and disulfite $(S_2O_5^=)$, and
    injecting the primary treated aqueous media into the untreated aqueous media to form a secondary aqueous media having a pH of between 6.0 and 6.8, and approximately 40 to 65% of the bicarbonates are removed; and
    applying the secondary aqueous media to soil to adjust and maintain the soil pH between approximately 6.2 and approximately 7.8 and bicarbonate levels between approximately 40% and approximately 60%.

11. A water and soil treatment method according to claim 10, wherein the SO$_2$ is injected into the primary treated aqueous media until the media is essentially bicarbonate free.

12. A water and soil treatment method for adjusting the bicarbonate percentages and pH of aqueous solutions with SO2 for field application to acidic soils for crop improvement comprising:
    injecting SO2 into an aqueous media to form an aqueous system containing hydrated sulfur dioxide $(H_2O).SO_2)$, bisulfite $(HSO_3^-)$, sulfite $(SO_4^=)$, and disulfite $(S_2O_5^=)$,
    adjusting the pH of the aqueous medial to a pH of 7 to 7.8 by admixing ammonia, and
    applying the SO2 enriched pH adjusted media to the acidic soil to adjust and maintain the soil pH between 6.0 and 6.8, and effect a bicarbonate removal of between 40–65%.

13. A water and soil treatment method according to claim 12 wherein the aqueous media is irrigation water.

14. A water and soil treatment method according to claim 13 wherein the aqueous media is sewage sludge.

15. A water and soil treatment method according to claim 14, wherein the sewage sludge pH is lowered to approximately 2 and held there sufficiently until the desired pathogen kill is achieved, and is then adjusted to the desired pH for soil application.

16. A water and soil treatment method according to claims 1, 10, or 12, including admixing other aqueous nutrient supplements into the treated aqueous mixture before application to the soil.

* * * * *